(12) United States Patent
Kashihara

(10) Patent No.: US 10,679,796 B2
(45) Date of Patent: Jun. 9, 2020

(54) SOLID ELECTROLYTIC CAPACITOR

(71) Applicant: Panasonic Intellectual Property Management Co., Ltd., Osaka (JP)

(72) Inventor: Masanori Kashihara, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/128,399

(22) Filed: Sep. 11, 2018

(65) Prior Publication Data

US 2019/0027314 A1   Jan. 24, 2019

Related U.S. Application Data

(63) Continuation of application No. PCT/JP2017/006465, filed on Feb. 22, 2017.

(30) Foreign Application Priority Data

Mar. 25, 2016  (JP) ................................. 2016-062653

(51) Int. Cl.
| | |
|---|---|
| *H01G 9/15* | (2006.01) |
| *H01G 9/07* | (2006.01) |
| *H01G 9/028* | (2006.01) |
| *H01G 9/052* | (2006.01) |
| *H01G 9/00* | (2006.01) |
| *H01G 9/042* | (2006.01) |

(Continued)

(52) U.S. Cl.
CPC ............. *H01G 9/07* (2013.01); *H01G 9/0036* (2013.01); *H01G 9/028* (2013.01); *H01G 9/052* (2013.01); *H01G 9/0525* (2013.01); *H01G 9/15* (2013.01); *H01G 9/0032* (2013.01); *H01G 9/042* (2013.01); *H01G 9/10* (2013.01); *H01G 2009/05* (2013.01)

(58) Field of Classification Search
None
See application file for complete search history.

(56) References Cited

U.S. PATENT DOCUMENTS

| | | | | |
|---|---|---|---|---|
| 4,785,380 | A * | 11/1988 | Harakawa | ............ H01G 9/0032 361/527 |
| 9,318,268 | B2 * | 4/2016 | Onoue | ................... H01G 9/028 |

(Continued)

FOREIGN PATENT DOCUMENTS

JP   2011-049276   3/2011

OTHER PUBLICATIONS

International Search Report of PCT application No. PCT/JP2017/006465 dated May 16, 2017.

*Primary Examiner* — Dion Ferguson
(74) *Attorney, Agent, or Firm* — McDermott Will & Emery LLP

(57) ABSTRACT

A solid electrolytic capacitor includes a capacitor element. The capacitor element includes an anode body that is a porous sintered body, a dielectric layer disposed on a surface of the porous sintered body, an insulating material disposed on a surface of the dielectric layer, and a solid electrolyte layer disposed on a surface of the insulating material. The capacitor element has at least one corner part. An amount of the insulating material disposed in the at least one corner part of the capacitor element is larger than an amount of the insulating material disposed in a center part of the capacitor element.

13 Claims, 2 Drawing Sheets

(51) Int. Cl.
    *H01G 9/10*    (2006.01)
    *H01G 9/04*    (2006.01)

(56) References Cited

U.S. PATENT DOCUMENTS

| | | | | |
|---|---|---|---|---|
| 2002/0015279 | A1* | 2/2002 | Sakai | H01G 9/15 361/523 |
| 2004/0027789 | A1* | 2/2004 | Kochi | H01G 9/012 361/523 |
| 2004/0136144 | A1* | 7/2004 | Hirota | H01G 9/04 361/523 |
| 2010/0079928 | A1* | 4/2010 | Harada | H01G 9/15 361/523 |
| 2010/0103590 | A1* | 4/2010 | Saida | C08G 61/126 361/525 |
| 2010/0254071 | A1* | 10/2010 | Nishimura | H01G 9/0032 361/524 |
| 2012/0212880 | A1* | 8/2012 | Ishimaru | H01G 9/028 361/530 |
| 2014/0285951 | A1* | 9/2014 | Otani | H01G 9/012 361/528 |
| 2017/0365415 | A1* | 12/2017 | Demizu | H01G 9/045 |
| 2018/0108487 | A1* | 4/2018 | Petrzilek | H01G 9/028 |

* cited by examiner

SOLID ELECTROLYTIC CAPACITOR

RELATED APPLICATIONS

This application is a continuation of the PCT International Application No. PCT/JP2017/006465 filed on Feb. 22, 2017, which claims the benefit of foreign priority of Japanese patent application No. 2016-062653 filed on Mar. 25, 2016, the contents all of which are incorporated herein by reference.

BACKGROUND

1. Technical Field

The present disclosure relates to a solid electrolytic capacitor, and particularly to reduction in a leakage current.

2. Description of the Related Art

In recent years, a small-sized and large-capacitance capacitor for high frequency applications has been desired along with downsizing and lightening of electronic devices. As such a capacitor, a solid electrolytic capacitor low in equivalent series resistance (ESR) and excellent in frequency characteristics has been developed. The solid electrolytic capacitor includes an anode body, a dielectric layer formed on a surface of the anode body, and a solid electrolyte layer formed on a surface of the dielectric layer. As the anode body, a porous sintered body formed by sintering powder of a valve metal is used.

The dielectric layer is formed, for example, by anodization of the porous sintered body. The porous sintered body, especially a corner part of the porous sintered body is easy to be damaged by an external stress and an internal stress. Therefore, the dielectric layer formed by anodization of the porous sintered body is also easy to be damaged. Damage to the dielectric layer causes increase in the leakage current. Unexamined Japanese Patent Publication No. 2011-49276 discloses that a projecting part formed of an insulating resin is formed outside a corner part or a ridge including a corner part of a sintered body having a cubic shape.

SUMMARY

A solid electrolytic capacitor of the present disclosure includes a capacitor element. The capacitor element includes an anode body that is a porous sintered body, a dielectric layer disposed on a surface of the porous sintered body, an insulating material disposed on a surface of the dielectric layer, and a solid electrolyte layer disposed on a surface of the insulating material. The capacitor element has at least one corner part. An amount of the insulating material disposed in the at least one corner part of the capacitor element is larger than an amount of the insulating material disposed in a center part of the capacitor element.

Another solid electrolytic capacitor of the present disclosure includes a capacitor element. The capacitor element includes an anode body that is a porous sintered body, a dielectric layer disposed on a surface of the porous sintered body, a silane compound disposed on a surface of the dielectric layer, and a solid electrolyte layer disposed on a surface of the insulating material. The capacitor element has at least one corner part. An amount of the silane compound disposed in the at least one corner part of the capacitor element is larger than an amount of the silane compound disposed in a center part of the capacitor element.

According to the present disclosure, it is possible to reduce the leakage current while keeping the capacitance of the solid electrolytic capacitor.

DETAILED DESCRIPTION OF EMBODIMENT

Prior to describing an exemplary embodiment of the present disclosure, a problem in conventional techniques will be briefly described. In the method disclosed in Unexamined Japanese Patent Publication No. 2011-49276, since the projecting part is formed outside a corner part or a ridge of the sintered body, the proportion of the part that fails to contribute to the capacitance in the solid electrolytic capacitor increases. Therefore, the capacitance density of the solid electrolytic capacitor diminishes. Further, in Unexamined Japanese Patent Publication No. 2011-49276, since an anodizing treatment is performed after formation of the projecting part, the adhesiveness between the porous sintered body and the dielectric layer tends to deteriorate. Entry of the solid electrolyte into a gap between the porous sintered body and the dielectric layer can cause occurrence of a leakage current.

Figure 1:
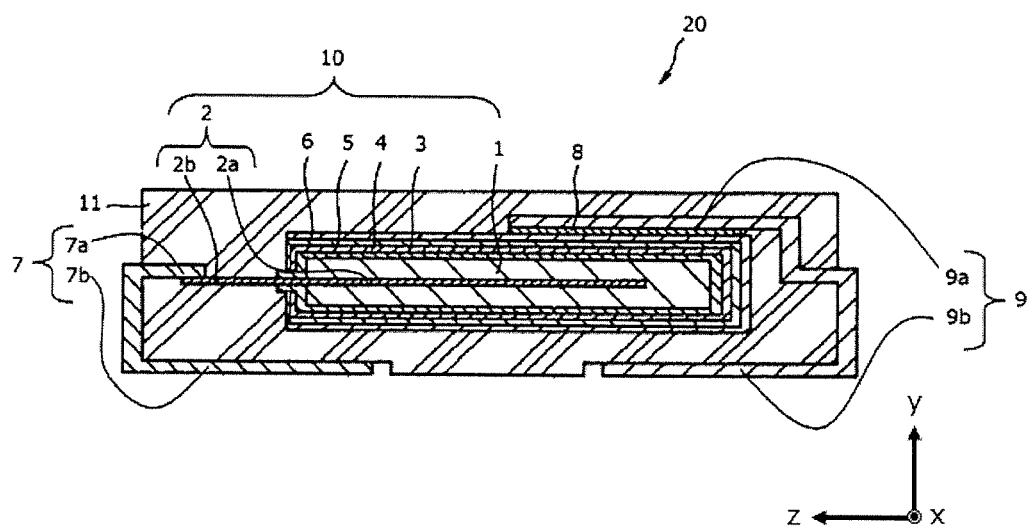
FIG. 1 is a schematic sectional view illustrating a solid electrolytic capacitor according to one exemplary embodiment of the present disclosure.

A solid electrolytic capacitor according to one exemplary embodiment of the present disclosure is described with reference to FIG. 1. FIG. 1 is a schematic sectional view illustrating solid electrolytic capacitor 20 according to the present exemplary embodiment.

<Solid Electrolytic Capacitor>

Solid electrolytic capacitor 20 includes capacitor element 10, outer package 11 that encapsulates capacitor element 10, and anode terminal 7 and cathode terminal 9 each exposed to the outside of outer package 11. Capacitor element 10 includes anode body 1 which is a porous sintered body, anode lead 2, dielectric layer 3 formed on a surface of anode body 1, an insulating material or a silane compound disposed on a surface of the dielectric layer (hereinafter, collectively referred to as protective material 4), and solid electrolyte layer 5 formed on a surface of protective material 4. Capacitor element 10 further includes cathode layer 6 that covers a surface of solid electrolyte layer 5. Capacitor element 10 has at least one corner part. Here, a corner part means a part including an apex formed by intersection of at least three ridges that form the outer shape of capacitor element 10 or the outer shape of anode body 1.

Embedded part 2a of anode lead 2, which includes one end of anode lead 2, is embedded in anode body 1 from one face of anode body 1. Extended part 2b of anode lead 2, which includes the other end of anode lead 2, is electrically connected to connection part 7a of anode terminal 7, which is encapsulated by outer package 11, by welding, for example. On the other hand, cathode layer 6 is electrically connected to connection part 9a of cathode terminal 9, which is encapsulated by outer package 11, with conductive adhesive material 8 (e.g. a mixture of a thermosetting resin with metal particles) disposed between cathode layer 6 and connection part 9a. Exposed part 7b of anode terminal 7 and exposed part 9b of cathode terminal 9 are each drawn out from different side faces of outer package 11, and extend to one main flat face (lower face in FIG. 1) in an exposed state. The exposed portions of the terminals on the flat face are used for, for example, solder connection to a substrate (not shown in the drawings) on which solid electrolytic capacitor 20 is to be mounted.

(Anode Body)

Anode body 1 is a porous sintered body obtained by sintering powder of a valve metal or powder of an alloy containing a valve metal, and has at least one corner part. Therefore, in capacitor element 10, at least one corner part is formed. Anode body 1 is prepared by compression-molding powder of a valve metal or the like into, for example, a hexahedron, and sintering the hexahedron. At this time, by performing the compression molding and sintering in the condition that embedded part 2a is embedded in the hexahedron, it is possible to draw out extended part 2b from one face of anode body 1 in such a manner that extended part 2b is planted. While FIG. 1 illustrates anode body 1 having rectangular cross section, the shape of the anode body is not limited to this, and is only required to have at least one corner part.

As a material that constitutes anode body 1, there can be used one or two or more in combination of valve metals such as titanium (Ti), tantalum (Ta), and niobium (Nb). An oxide of a valve metal has a high dielectric constant and is therefore suitable as a constituent material of the anode member. The materials may also be an alloy made of two or more metals. The alloy of a valve metal includes the valve metal as a main component and preferably includes the valve metal in an amount of 50 atom % or more.

An average particle diameter D50 of primary particles of powder of valve metal preferably ranges from 0.05 μm to 0.5 μm, inclusive, for example. Here, the average particle diameter D50 is a median diameter in a volume particle size distribution measured by a laser diffraction type particle size distribution measuring apparatus (the same applies hereinafter).

(Anode Lead)

Anode lead 2 is made of, for example, a conductive wire. As a conductive material that constitutes anode lead 2, the valve metals described above can be exemplified. The materials that constitute anode body 1 and anode lead 2 may be the same kind or different kinds.

(Dielectric Layer)

Dielectric layer 3 is formed by anodizing, through an anodizing treatment or the like, the surface of anode body 1. The anodic oxidation may be performed by a publicly known method. Dielectric layer 3 is not particularly limited, but may be any insulating layer functioning as dielectric.

(Protective Material)

Dielectric layer 3 is likely to be damaged by an external stress and an internal stress. In order to inhibit the damage to dielectric layer 3, protective material 4 for protecting dielectric layer 3 is disposed between dielectric layer 3 and solid electrolyte layer 5. In particular, since dielectric layer 3 is easy to be damaged in a corner part of capacitor element 10, protective material 4 is disposed to be unevenly distributed in the corner part. This suppresses damage especially in a corner part of dielectric layer 3. By disposing protective material 4 also in a center part of capacitor element 10, damage to dielectric layer 3 is easy to be suppressed also in the center part. At this time, when protective material 4 is insulative (namely, insulating material), protective material 4 functions on behalf of dielectric layer 3 even when dielectric layer 3 is damaged, so that a leakage current is suppressed more easily. As a result, pressure resistance is improved. Protective material 4 is formed between dielectric layer 3 and solid electrolyte layer 5. Therefore, anode body 1 and dielectric layer 3 are adhered closely. Therefore, a leakage current is inhibited more easily.

Uneven distribution means the condition that the amount of protective material 4 existing especially in a corner part is large while protective material 4 exists also in a center part of anode body 1. For example, mass Wvi of protective material 4 per unit volume in a corner part of capacitor element 10 is larger than mass Wci of protective material 4 per unit volume in a center part of capacitor element 10. Among these, Wvi/Wci which is a ratio of mass Wvi to mass Wci preferably ranges from 50 to 1000, inclusive, more preferably from 50 to 500, inclusive.

Existence of protective material 4 can be confirmed by analysis of a cross section of capacitor element 10, for example, by element mapping using an electronic probe micro analyzer (EPMA). Specifically, for an element contained in protective material 4 (element contained in protective material), element mapping can be conducted, and image processing such as a binarization treatment can be performed. Alternatively, an element contained in protective material is color mapped. From the obtained image, area proportions in a corner part and in an entire center part of the mapped element contained in protective material are determined, and compared. When the area proportion in the corner part is larger than the area proportion in the center part, it can be regarded that more protective material 4 is distributed in the corner part than in the center part. The element contained in protective material is preferably an element that is rarely contained in other constituents that constitute capacitor element 10. For example, when protective material 4 is a silane compound, silicon is selected as the element contained in protective material.

Figure 2:
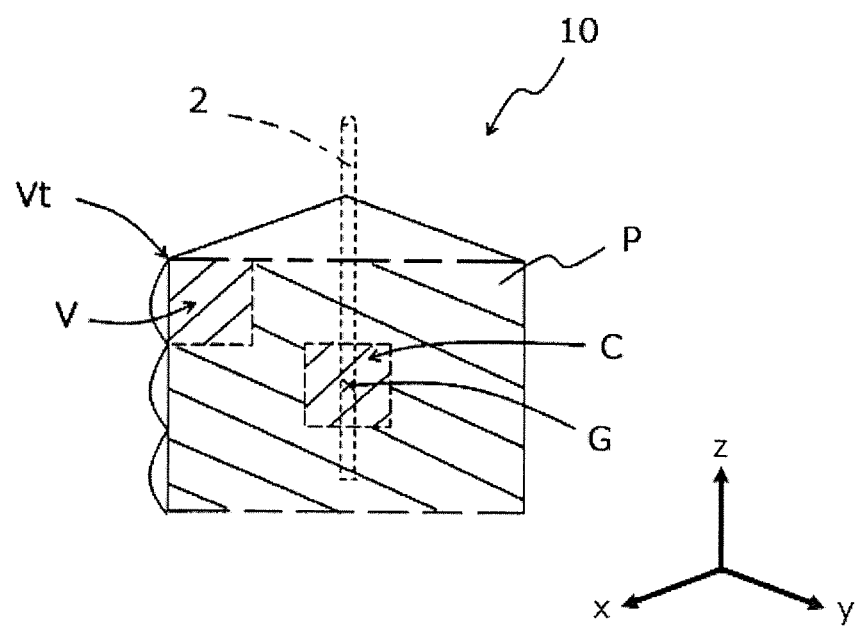
FIG. 2 is a schematic perspective view of the capacitor element illustrating a cross section P including a corner part and a center part of the capacitor element.

A corner part is specifically determined in the following manner. FIG. 2 is a schematic perspective view of capacitor element 10 illustrating cross section P including a corner part and a center part of capacitor element 10. As shown in FIG. 2, capacitor element 10 is cut along a plane passing through gravity G of capacitor element 10 and a point formed by intersection of at least three ridges of capacitor element 10 (apex Vt). The obtained cross section is defined as cross section P. In FIG. 2, a part of capacitor element 10 at front side of cross section P is not shown. In cross section P, a square including apex Vt as one of apexes and having a length of one side of one-third the shortest side of cross section P is defined as corner part V. Center part C of anode body 1 is a region including a center of gravity G as the center, and having an outer shape of the square of the same size as corner part V. When anode lead 2 spans center part C, the region excluding anode lead 2 can be defined as center part C.

When anode lead 2 is planted from anode body 1, and anode lead 2 passes through the center of gravity G, capacitor element 10 is cut together with anode lead 2 and analyzed. In this case, the center of gravity G of capacitor element 10 can be determined on the assumption that capacitor element 10 is formed of a single material except for anode lead 2. Cutting of capacitor element 10 including anode lead 2 can be performed in the following manner.

First, after putting capacitor element 10 in a bottomed vessel, a thermosetting resin (for example, epoxy resin, acryl resin, and the like) is flown into the vessel and hardened. Thereafter, anode lead 2 and capacitor element 10 are cut together with the thermosetting resin.

Further, the area proportions calculated as described above can be regarded as each mass Wi (mass Wvi and mass Wci) of protective material 4 per unit volume of capacitor element 10. Accordingly, the ratio Wvi/Wci can be calculated from the above area proportions. When the ratio Wvi/Wci is near 1, specifically, the ratio Wvi/Wci ranges from 0.95 to 1.05, protective material 4 can be regarded as not being unevenly distributed.

Uneven distribution of protective material 4 in a corner part can be analyzed, for example, on the basis of the surface of capacitor element 10 before formation of the solid electrolyte layer and the cathode layer (hereinafter referred to as an intermediate body). In the element mapping of the surface of the intermediate body using EPMA, if the area proportion of element contained in the protective material in corner part VS of the surface of the intermediate body is larger than the area proportion in center part CS of the surface, it can be regarded that more protective material 4 is disposed in corner part V of capacitor element 10 than in center part C. Corner part VS of the surface is a square including a point where two sides intersect as one of apexes and having a length of one side of one-third the shortest side of the surface in the surface of any one face of the intermediate body. Center part CS of the surface is a region including gravity GS of the surface as the center, and having an outer shape of the square of the same size as corner part VS. The respective area proportions in corner part VS and center part CS can be regarded as masses in the respective regions as is described above. At this time, a ratio of mass Wvsi per unit volume of protective material 4 contained in corner VS to mass Wcsi per unit volume of protective material 4 contained in center part CS: Wvsi/Wcsi can be smaller than Wvi/Wci. In other words, protective material 4 can be unevenly distributed in corner part V of capacitor element 10 in a ratio larger than Wvsi/Wcsi.

When protective material 4 is disposed as an alternative for dielectric layer 3, protective material 4 preferably has an insulating property. From the view point of improvement in adhesiveness between dielectric layer 3 and solid electrolyte layer 5, it is preferred that protective material 4 is a silane compound. The silane compound is, for example, a hydrolysis reactant of a silane coupling agent. In this case, the silane compound may be interposed between dielectric layer 3 and solid electrolyte layer 5 and may be chemically bound to dielectric layer 3 and solid electrolyte layer 5. Examples of the insulating material include polymers that constitute solid electrolyte layer 5 (not including dopant) such as polypyrrole, polythiophene, polyaniline and derivatives thereof, and polymers such as polyvinylene alcohol, polyethylene, and epoxy resin (hereinafter, collectively called protective polymer). Examples of the silane coupling agent include γ-glycidoxypropyltrimethoxysilane, 3-aminopropyltrimethoxysilane and mercaptopropyl trimethoxysilane.

(Solid Electrolyte Layer)

Solid electrolyte layer 5 is formed on at least part of a surface of protective material 4. Solid electrolyte layer 5 contains, for example, a manganese compound and a conductive polymer. Examples of the conductive polymer include polypyrrole, polythiophene, polyaniline, and derivatives of polypyrrole, polythiophene, and polyaniline.

Solid electrolyte layer 5 containing a conductive polymer can be formed through, for example, chemical polymerization and/or electrolytic polymerization of a raw material monomer on protective material 4. Alternatively, solid electrolyte layer 5 may be formed by applying, to protective material 4, a liquid containing the conductive polymer.

Protective material 4 is unevenly distributed in corner part V of capacitor element 10. Therefore, solid electrolyte layer 5 formed on a surface of protective material 4 can be unevenly distributed in center part C of capacitor element 10, conversely. That is, in center part C of capacitor element 10, more solid electrolyte layer 4 is formed than in corner part V. In other words, mass Wce per unit volume of solid electrolyte layer 5 in center part C of capacitor element 10 can become larger than mass Wve per unit volume of solid electrolyte layer 5 in corner part V of capacitor element 10. A ratio of mass Wce to mass Wve: Wce/Wve ranges, for example, from 50 to 1000, inclusive, and may range from 50 to 500, inclusive. Ratio: Wce/Wve can be calculated while the area proportion in each region of solid electrolyte layer 5 calculated by element mapping is regarded as mass Wce or Wve as is the case with the aforementioned mass Wi of protective material 4.

(Cathode Layer)

Cathode layer 6 includes, for example, a carbon layer, and a metal (for example, silver) paste layer formed on a surface of the carbon layer (both not illustrated). Cathode layer 6 is formed by sequentially applying a carbon paste and a silver paste. Cathode layer 6 is not limited to this configuration and is satisfactory as long as the cathode layer is configured to have a function of current collection.

As described above, anode body 1 and anode lead 2 constitute the anode member of capacitor element 10, solid electrolyte layer 5 and cathode layer 6 constitute a cathode member of capacitor element 10, and dielectric layer 3 constitutes a dielectric member of capacitor element 10. Protective material 4 protects dielectric layer 3, or functions as an alternative for dielectric layer 3, especially in corner part V of capacitor element 10.

(Outer Package)

Lastly, capacitor element 10 is encapsulated by outer package 11. As a result, capacitor element 10 is electrically insulated from outside. Outer package 11 is formed of, for example, insulating resin. Examples of the insulating resin include epoxy resin, phenol resin, silicone resin, melamine resin, urea resin, alkyd resin, polyurethane, polyimide, polyamide-imide, and unsaturated polyester.

(Method for Producing Solid Electrolytic Capacitor)

One example of a method for producing the solid electrolytic capacitor according to the present exemplary embodiment is described.

(1) Step of Preparing Anode Member

Powder of a valve metal and anode lead 2 are put in a die so that embedded part 2a of anode lead 2 is embedded in the powder of the valve metal, compression-molded, then sintered in a vacuum to prepare an anode member in which part of anode lead 2 is planted. The pressure during molding is not particularly limited. The powder of the valve metal may be mixed with a binder such as polyacrylic carbonate as necessary.

(2) Step of Forming Dielectric Layer

On a surface of anode body 1, dielectric layer 3 is formed. Specifically, anode body 1 is immersed in an electrolytic aqueous solution (e.g., phosphoric acid aqueous solution) filling an anodization tank. And extended part 2b of anode lead 2 is connected to the anode body in the anodization tank to perform anodization, so that dielectric layer 3 made of an oxide film of the valve metal can be formed on a surface of anode body 1. As the electrolytic aqueous solution, not only the phosphoric acid aqueous solution but also, for example, nitric acid, acetic acid, and sulfuric acid can be used.

(3) Step of Disposing Protective Material

Figure 3:
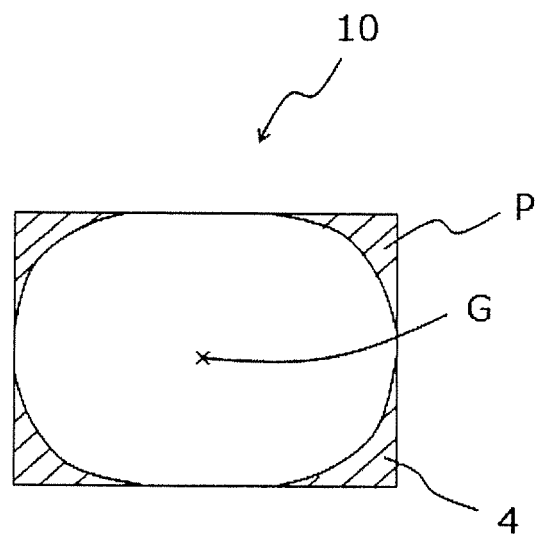
FIG. 3 is a schematic sectional view of the cross section P in FIG. 2 illustrating the appearance in which an insulating material or a silane compound is unevenly distributed in a corner part of the capacitor element.

Next, on a surface of dielectric layer 3, protective material 4 is disposed. Specifically, anode body 1 on which dielectric layer 3 is formed is immersed in a treatment liquid containing a protective polymer (or a raw material thereof) which is a material for protective material 4 or a silane coupling agent. After impregnating anode body 1 with the treatment liquid, anode body 1 is pulled up, and a solvent or a dispersion medium contained in the treatment liquid (collectively, called liquid component) is removed. At this time, the liquid component is removed by letting the liquid component evaporate gradually. When the liquid component evaporates, the liquid component induces a flow (coffee stain phenomenon). That is, from the center part of anode body 1, a flow directed to the surface where evaporation of the liquid component is easy to occur, particularly directed to corner part V is induced. The raw material of protective material 4 migrates in the flow from center part C of anode body 1 toward corner part V and deposits to be unevenly distributed in corner part V as shown in FIG. 3. FIG. 3 schematically illustrates cross section P in a plane of capacitor element 10. In FIG. 3, protective material 4 in anode lead 2 and center part C is omitted, and protective material 4 unevenly distributed in corner part V is indicated by hatching.

According to the present exemplary embodiment, by a simple method of gradually drying after impregnation with a treatment liquid containing a raw material of protective material 4, it is possible to make protective material 4 be unevenly distributed in the proximity of a corner part of anode body 1. Therefore, it is possible to make protective material 4 be unevenly distributed without significant deterioration in productivity. Further, according to the above method, since the raw material of protective material 4 migrates in a flow generated inside anode body 1, the raw material will not be largely extruded outside anode body 1. Therefore, the outer shape of capacitor element 10 does not increase excessively.

It is important to control the speed of removing the liquid component (drying speed) so as to make the raw material of protective material 4 be unevenly distributed in corner part V. For example, it is preferred that anode body 1 is immersed in the treatment liquid, pulled up, and then dried over 30 minutes or more so that the mass of the liquid component with which anode body 1 is impregnated reduces by 90% (the remaining amount is 10% by mass). In particular, from the view point of productivity, it is preferred to dry over 30 minutes or more under normal temperature and normal pressure (for example, 20° C., atmospheric pressure) at a humidity of 50% or more.

In the case of removing the liquid component under normal temperature and normal pressure, as the liquid component for which 30 minutes or longer time is required for removal of 90% by mass, a compound having a lower volatility than water can be recited. Boiling point can be one index for the magnitude of the volatility. In the above case, as the liquid component, a compound having a higher boiling point than water (for example, in the range of about 110° C. to 200° C., preferably in the range of about 110° C. to 150° C.) is preferably used.

Examples of the liquid component having a higher boiling point than water include 1-butanol, 2-methyl butanol, ethylene glycol, acetic acid, acetic anhydride, butyl acetate, dibutylether, toluene, o-xylene, dimethylformamide, acetylacetone, benzaldehyde, chloromethyloxirane, diethyl carbonate, 1,4-dioxane, 2-chloroethanol, n-octane, 1-pentanol, 3-pentanol, diethylene glycol monoethyl ether, formic acid, pyridine, tetrachloroethylene, and dimethyl sulfoxide. These may be used alone or in combination of two or more.

The liquid component used is not limited to these, but a liquid component having appropriate volatility (boiling point) may be appropriately selected depending on the drying condition. In the case of removing the liquid component under heating, a liquid component having a higher boiling point than the liquid components as exemplified above can be used. In the case of removing the liquid component under cooling, a liquid component having a lower boiling point than the liquid components as exemplified above (for example, ethanol, acetone or the like) can be used. After removal of 90% of the liquid component by the above drying condition, heating or the like may further be performed. Impregnation with the silane coupling agent can accelerate the polymerization reaction of the silane coupling agent.

(4) Step of Forming Solid Electrolyte Layer

In the present exemplary embodiment, a step of forming solid electrolyte layer 5 including a conductive polymer is described.

Solid electrolyte layer 5 containing a conductive polymer (first solid electrolyte layer) is formed on at least part of a surface of protective material 4, for example, by a method of impregnating anode body 1 on which protective material 4 is disposed with a monomer or an oligomer, and then polymerizing the monomer or the oligomer, or by a method of impregnating anode body 1 on which protective material 4 is disposed with a liquid containing a conductive polymer, and drying the liquid. Further, a solid electrolyte layer containing a second conductive polymer (second solid electrolyte layer) may be formed on top of solid electrolyte layer 4. The second solid electrolyte layer is formed, for example, by the same method as the method for forming the first solid electrolyte layer.

Figure 4:
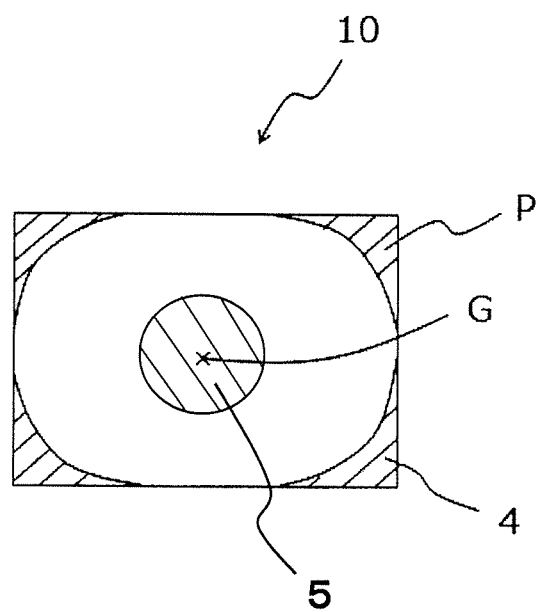
FIG. 4 is a schematic sectional view of the cross section P in FIG. 2 illustrating the appearance in which a solid electrolyte layer is unevenly distributed in a center part of the capacitor element.

FIG. 4 is a schematic sectional view of the cross section P in FIG. 2 illustrating the appearance in which a solid electrolyte layer is unevenly distributed in a center part of the capacitor element. FIG. 4 schematically illustrates cross section P in a plane of capacitor element 10 as the same as FIG. 3. In FIG. 4, solid electrolyte layer 5 unevenly distributed in center part C of capacitor element 10 is indicated by hatching. As shown in FIG. 4, in center part C of capacitor element 10, more solid electrolyte layer 5 is formed than in corner part V.

(5) Step of Forming Cathode Layer

Cathode layer 6 formed of a carbon layer and a silver paste layer can be formed by sequentially applying a carbon paste and a silver paste on a surface of solid electrolyte layer 5. A configuration of cathode layer 6 is not limited to this example, and it is sufficient if the cathode layer has a function of power collection.

Hereinafter, the present disclosure is described in more detail with reference to examples. The present disclosure, however, is not to be considered to be limited to the examples.

Example 1

An electrolytic capacitor was prepared in the following manner.

(Step 1) Preparation of Anode Member

As a valve metal, tantalum metal particles whose primary particles had an average particle diameter D50 of about 0.1 µm and whose secondary particles had an average particle diameter of about 0.2 μm were used. By using the powder of tantalum metal and an anode lead made of tantalum, an anode member in which a part of the anode lead (embedded part) is embedded in the anode body was formed according to the aforementioned method.

(Step 2) Formation of Dielectric Layer

The anode body and a part of the anode lead were immersed in a phosphoric acid aqueous solution which is an electrolytic aqueous solution filling an anodization tank and other part of the anode lead (extended part) was connected to the anode body in the anodization tank. Then, anode oxidation was performed to form a uniform dielectric layer of tantalum oxide ($Ta_2O_5$) on a surface of the anode body (a surface of a porous sintered body including inner wall surfaces of pores) and a surface of a part of the anode lead. The anode oxidation was performed by using a 0.02% by mass phosphoric acid aqueous solution at a formation voltage of 10 V.

(Step 3) Disposition of Protective Material

γ-glycidoxypropyltrimethoxysilane as a raw material of the protective material was dissolved in 1-butanol to prepare a treatment liquid having a concentration of 5% by mass. After impregnating the anode body on which the dielectric layer was formed with the obtained solution for 5 minutes, the anode body was pulled up, and left still for 30 minutes at normal temperature (20° C.) under an atmospheric pressure, and thus a silane compound (hydrolysis reactant of γ-glycidoxypropyltrimethoxysilane) was disposed on the surface of the dielectric layer. Then, the anode body was dried by being left still in a high temperature vessel at 210° C.

(Step 4) Formation of Solid Electrolyte Layer

A mixed solution was prepared by dissolving 3,4-ethylenedioxythiophene and a dopant, i.e., polystyrenesulfonic acid in ion-exchanged water. While the resultant mixed solution was stirred, ferric sulfate and sodium persulfate that were dissolved in ion-exchanged water was added to the mixed solution to cause a polymerization reaction. After the reaction, a resultant reaction solution was dialyzed to remove unreacted monomers and an excessive oxidant, so that a dispersion liquid was obtained that included about 3% by mass of polyethylenedioxythiophene doped with polystyrenesulfonic acid. After impregnating the anode body on which the silane compound was disposed with the obtained dispersion liquid, the anode body was dried to form a solid electrolyte layer on a surface of the silane compound.

(Step 5) Formation of Cathode Layer

By applying a carbon paste on a surface of the solid electrolyte layer, a carbon layer was formed. Next, by applying a silver paste on a surface of the carbon layer, a silver paste layer was formed. Thus, a cathode layer made up of the carbon layer and the silver paste layer was formed, and a capacitor element was obtained.

The masses per unit of the silane compound and the solid electrolyte layer in the corner part and the center part of the obtained capacitor element were calculated by the method as described above. Results are shown in Table 1.

(Step 6) Preparation of Solid Electrolytic Capacitor

The obtained capacitor element was encapsulated by the outer package to complete the solid electrolytic capacitor that is illustrated in FIG. 1 and then the following evaluation was conducted. Results are shown in Table 1.

[Evaluation]

Electrostatic capacitance and leakage current were measured for the obtained electrolytic capacitor (n=125). Electrostatic capacity was measured at a frequency of 120 Hz with an LCR meter. A leakage current was measured after 40 seconds of application of a voltage of 6.3 V between the anode body and the cathode. Results are shown in Table 1. Regarding the leakage current, the median and the maximum value of 125 samples are shown.

Comparative Example 1

A solid electrolytic capacitor (n=125) was prepared in the same manner as in Example 1 except that the step of disposing a protective material (Step 3) was not performed, and the solid electrolytic capacitor was evaluated. Results are shown in Table 1.

Comparative Example 2

A solid electrolytic capacitor (n=125) was prepared in the same manner as in Example 1 except that a treatment liquid in which γ-glycidoxypropyltrimethoxysilane is dissolved in acetone was used, and the solid electrolytic capacitor was evaluated. Results are shown in Table 1.

TABLE 1

| | Wvi/Wci | Wce/Wve | Electrostatic capacity (μF) | Leakage current median (μA) | Leakage current maximum value (μA) |
|---|---|---|---|---|---|
| Example 1 | 100 | 100 | 14.2 | 0.33 | 1.10 |
| Comparative Example 1 | 0 | 1 | 14.2 | 2.3 | 44.4 |
| Comparative Example 2 | 1 | 1 | 14.3 | 0.41 | 8.17 |

In Example 1 in which the protective material is unevenly distributed in the corner part of the capacitor element, the maximum value and the median of the leakage current reduced in comparison with Comparative Examples 1 and 2. In particular, the rate of decrease in the maximum value of the leakage current was high. On the other hand, the reduction in the electrostatic capacity of Example 1 was about 0.7% compared with Comparative Example 2.

In Comparative Example, 2, the silane compound is not unevenly distributed in a corner part of the capacitor element as is apparent from Wvi/Wci=1. Therefore, the effect of ameliorating the leakage current is low. In Comparative Example 2, since acetone having high volatility is used as a liquid component of the treatment liquid, it is considered that vaporization of acetone completes before the silane compound has sufficiently flown in Step 3, and uneven distribution of the silane compound does not occur. When a liquid component having high volatility such as acetone is used, it is possible to make the silane compound be unevenly distributed in a corner of the capacitor element by performing active cooling in Step 3.

The electrolytic capacitor according to the present disclosure has excellent reliability and thus is applicable to various usages.

What is claimed is:

1. A solid electrolytic capacitor comprising a capacitor element, the capacitor element having at least one corner part and including:
   an anode body that is a porous sintered body,
   a dielectric layer disposed on a surface of the porous sintered body,
   an insulating material disposed on a surface of the dielectric layer, and
   a solid electrolyte layer disposed on a surface of the insulating material, wherein mass Wvi of the insulating material per unit volume of the capacitor element in the at least one corner part of the capacitor element is greater than mass Wci of the insulating material per unit volume of the capacitor element in a center part of the capacitor element.

2. The solid electrolytic capacitor according to claim 1, wherein Wvi/Wci that is a ratio of the mass Wvi to the mass Wci ranges from 50 to 1000, inclusive.

3. The solid electrolytic capacitor according to claim 1, wherein a mass of the solid electrolyte layer disposed in the center part of the capacitor element is larger than a mass of the solid electrolyte layer disposed in the at least one corner part of the capacitor element.

4. The solid electrolytic capacitor according to claim 2, wherein a mass of the solid electrolyte layer disposed in the center part of the capacitor element is larger than a mass of the solid electrolyte layer disposed in the at least one corner part of the capacitor element.

5. A solid electrolytic capacitor comprising a capacitor element, the capacitor element having at least one corner part and including:
- an anode body that is a porous sintered body,
- a dielectric layer disposed on a surface of the porous sintered body,
- a silane compound disposed on a surface of the dielectric layer, and
- a solid electrolyte layer disposed on a surface of the silane compound,
- wherein mass Wvi of the silane compound per unit volume of the capacitor element in the at least one corner part of the capacitor element is greater than mass Wci of the silane compound per unit volume of the capacitor element in a center part of the capacitor element.

6. The solid electrolytic capacitor according to claim 5, wherein the silane compound is a hydrolysis reactant of a silane coupling agent.

7. The solid electrolytic capacitor according to claim 5, wherein Wvi/Wci that is a ratio of the mass Wvi to the mass Wci ranges from 50 to 1000, inclusive.

8. The solid electrolytic capacitor according to claim 6, wherein Wvi/Wci that is a ratio of the mass Wvi to the mass Wci ranges from 50 to 1000, inclusive.

9. The solid electrolytic capacitor according to claim 1, wherein the center part of the capacitor element includes a center of gravity of the capacitor element.

10. The solid electrolytic capacitor according to claim 5, wherein the center part of the capacitor element includes a center of gravity of the capacitor element.

11. A solid electrolytic capacitor comprising a capacitor element, the capacitor element having at least one corner part and including:
- an anode body that is a porous sintered body,
- a dielectric layer disposed on a surface of the porous sintered body,
- a protective material disposed on a surface of the dielectric layer, and
- a solid electrolyte layer disposed on a surface of the protective material,
- wherein in a cross section of the capacitor element which is cut along a plane passing through a center of gravity of the capacitor element and an apex of the capacitor element in the at least one corner part, a mass of the protective material in a first square region is greater than a mass of the protective material in a second square region, the first square region including the apex and having four sides each having a length of one-third of shortest side of the cross section, the second square region including the center of gravity and having a same size as the first square region.

12. The solid electrolytic capacitor according to claim 11, wherein the protective material includes an insulating material.

13. The solid electrolytic capacitor according to claim 11, wherein the protective material includes a silane compound.

* * * * *